United States Patent [19]
Moon

[11] Patent Number: 6,007,646
[45] Date of Patent: Dec. 28, 1999

[54] ELECTRODE MATERIAL AND METHODS FOR MANUFACTURING ELECTRODE MATERIAL AND ELECTRODE

[75] Inventor: Jung-Gi Moon, Taejon, Rep. of Korea

[73] Assignee: Korea Institute of Machinery and Materials, Taejon, Rep. of Korea

[21] Appl. No.: 09/097,208

[22] Filed: Jun. 12, 1998

[30] Foreign Application Priority Data

Apr. 22, 1998 [KR] Rep. of Korea .................. 98-14397

[51] Int. Cl.[6] ................................................ B22F 1/00
[52] U.S. Cl. ................................................ 148/513
[58] Field of Search ................................................ 148/513

[56] References Cited

U.S. PATENT DOCUMENTS 5,534,086  7/1996  Andrus ............................ 148/513
5,639,318  6/1997  Edelstein et al. ................ 148/513
5,850,047  12/1998  Tani et al. ........................ 75/246

*Primary Examiner*—Daniel J. Jenkins
*Attorney, Agent, or Firm*—Fish & Richardson P.C.

[57] ABSTRACT

An electrode material for special joining of light metals or spot resistance welding electrode and methods of the electrode material and an electrode are disclosed. An alloy powder is reduced to form a pure alloy powder after the alloy powder composed of copper and from about 0.1 to about 0.3% by weight of beryllium is annealed. The surface of the pure alloy powder is primary oxidized and the beryllium in the alloy powder is secondarily oxidized. The pure alloy powder is reduced to form the powder of a dispersion-hardening alloy comprising copper-beryllium oxide. The electrode made of such alloy can has some advantageous properties such as high heat resistance, high electrical conductivity, high heat conductivity, good abrasion resistance and good workability because the beryllium oxide is homogeneously dispersed through the alloy.

5 Claims, 5 Drawing Sheets

ELECTRODE MATERIAL AND METHODS FOR MANUFACTURING ELECTRODE MATERIAL AND ELECTRODE

BACKGROUND OF THE INVENTION

1. Field of the Invention

The present invention relates to an electrode material and methods for manufacturing the electrode material and an electrode, and more particularly to an electrode material having good properties such as heat resistance, electrical conductivity, heat conductivity, abrasion resistance and workability, and methods for manufacturing the electrode material and an electrode having the electrode material.

2. Prior Art

Concerning conventional electrodes such as special junction electrodes or spot resistance welding electrodes in order to join light metals or surface treatment steel sheets, the electrodes should have several properties including heat resistance, electrical conductivity, heat conductivity and abrasion resistance according their particular use. The electrode materials are also required such properties because the electrodes are made of the electrode materials. Furthermore, the electrode materials should have homogeneous structure and workability for forming the electrodes.

In general, the spot resistance welding electrode functions as a conductor for applying electricity to a material to be welded and a joining material for welding the material to be welded. Hence, the electrode having suitable properties are used as the spot resistance welding electrode in relation to the welding condition and the material to be welded. In most welding processes of the spot resistance welding electrodes, the spot resistance electrodes especially should have heat resistance and electrical conductivity at high temperature since the spot resistance electrodes are continuously subjected to the conditions of high temperature and high pressure. The electrode material should have low dispersity and should not fuse to the material to be welded as the spot resistance welding electrode which can be used under the condition of high temperature and high pressure for long periods.

Pure copper is mainly utilized as the conventional spot resistance welding electrode due to its high electrical conductivity and excellent consume resistance, however, the pure copper has defect of low mechanical strength. Therefore, in order to increase the strength of the pure copper, metals such as chrome (Cr), zirconium (Zr), silicon (Si), tungsten (W) or nickel (Ni) are added in small quantities to a base metal composed of the pure copper to form dispersion-hardening alloys which are utilized as the electrode materials. However, when the dispersion-hardening alloys composed of the above metals are used as the electrode materials, all of the required properties such as heat resistance, electrical conductivity, heat conductivity and abrasion resistance may not be present even though some properties may be partially present. For example, an alloy composed of copper-chrome is widely utilized as the spot resistance welding electrode and is manufactured by a typical casting method. In the alloy composed of copper as a base metal and by weight about 0.2% chrome, the copper-chrome alloy has enhanced mechanical strength because fine precipitated chrome is dispersed in the copper. However, when an electrode made of the copper-chrome alloy is welded to manufacture the spot resistance welding electrode, the thermal stability and abrasion resistance of the electrode made of the copper-chrome alloy are weakened because the precipitated chrome comes to have a large size by an arc-heat generated by the welding which takes place while the copper-chrome alloy is heated.

Therefore, a dispersion-hardening alloy composed of copper and metal oxide has been developed as an electrode material considering the problem of the copper-chrome alloy.

The dispersion-hardening alloy composed of copper and metal oxide includes a copper-aluminum oxide (Cu—$Al_2O_3$), a copper-silicon oxide (Cu—$SiO_2$), a copper-zirconium oxide (Cu—$ZrO_2$) and so on. It is known that the copper-aluminum oxide alloy has excellent characteristics as the electrode material among the dispersion-hardening alloy composed of copper and metal oxide.

The copper-aluminum oxide alloy is manufactured by the combination of the powder metallurgy technique and the internal oxidation method, The copper-aluminum alloy has superior creep resistance, electrical conductivity and thermal stability at room temperature as well as at high temperature, so the copper-aluminum alloy is suitable as the electrode material.

However, it is difficult to control the degree of the internal oxidation of the copper-aluminum oxide alloy because the optimal quantity of a copper-oxide which is added as an oxidant is hardly controlled when the copper-aluminum oxide alloy is manufactured by the powder metallurgy technique and the internal oxidation method. Thus, an electrode made of the copper-aluminum oxide alloy has low mechanical strength when the electrode is made by using the copper-aluminum alloy and by the extrusion method, the drawing method or the forging method since the aluminum oxide doesn't be formed as a fine particle and homogeneously dispersed in the copper-aluminum oxide alloy.

SUMMARY OF THE INVENTION

Considering the above-mentioned problems, it is a first object of the present invention to provide an electrode material having good characteristics such as heat resistance, electrical conductance, thermal conductance, abrasion resistance and workability by homogeneous dispersion of beryllium oxide in a dispersion-hardening alloy.

It is a second object of the present invention to provide a method for manufacturing an electrode material which is specially suited for manufacturing the electrode material.

It is a third object of the present invention to provide a method for manufacturing an electrode the good characteristics by using the electrode material.

To achieve the above objects, the method for manufacturing the electrode material comprises:

i) annealing an alloy powder comprising copper and between about 0.1% and about 0.3% by weight of beryllium around the copper under a vacuum;

ii) reducing the alloy powder by removing an oxide in the alloy powder to form a pure alloy powder;

iii) oxidizing a surface of the pure alloy powder by heating the pure alloy powder;

iv) oxidizing the beryllium contained in the pure alloy powder to form beryllium oxide in the pure alloy powder; and v) reducing the pure alloy powder under an atmosphere of hydrogen to form a powder of a dispersion-hardening alloy comprising copper-beryllium oxide.

Preferably, the step ii) is performed at a temperature of between about 400° C. and about 500° C. and under an atmosphere of hydrogen, the step iii) is performed at a temperature of between about 400° C. and about 500° C. and under an atmosphere of oxygen, and the step iv) is performed at a temperature of between about 900° C. and about 1000° C. and under an atmosphere of inert gas.

To achieve the above objects, an electrode material comprising a dispersion hardening alloy according to the above-described method is provided.

Also, to achieve the above objects, the method for manufacturing the electrode comprises:

a) annealing an alloy powder comprising copper and between about 0.1% and about 0.3% by weight of beryllium around the copper under a vacuum;

b) reducing the alloy powder by removing an oxide in the alloy powder to form a pure alloy powder;

c) oxidizing a surface of the pure alloy powder by heating the pure alloy powder;

d) oxidizing the beryllium contained in the pure alloy powder to form a beryllium oxide in the pure alloy powder;

e) reducing the pure alloy powder under an atmosphere of hydrogen to form a powder of a dispersion-hardening alloy comprising a copper-beryllium oxide;

f) forming a plate of the dispersion-hardening alloy by pressing the powder of the dispersion-hardening alloy and providing a base electrode under the plate of dispersion-hardening alloy;

g) charging an explosive above the plate of the dispersion-hardening alloy after attaching an internal pad between the plate and the explosive; and h) explosively welding the plate onto the base electrode so as to form an electrode material composed of the dispersion-hardening alloy by detonating the explosive.

Furthermore, to achieve the above objects, the method for manufacturing the electrode comprises:

i) a first annealing an alloy powder comprising copper and between about 0.1% and about 0.3% by weight of beryllium around the copper under a vacuum;

ii) reducing the alloy powder by removing an oxide in the alloy powder to form a pure alloy powder;

iii) oxidizing a surface of the pure alloy powder by heating the pure alloy powder;

iv) oxidizing the beryllium contained in the pure alloy powder to form a beryllium oxide in the pure alloy powder;

v) reducing the pure alloy powder under an atmosphere of hydrogen to form a powder of a dispersion-hardening alloy comprising a copper-beryllium oxide;

vi) forming a briquet composed of the dispersion-hardening alloy by pressing a flake of the dispersion-hardening alloy after forming the flake of the dispersion-hardening alloy;

vii) compressing the briquet composed of the dispersion-hardening alloy;

viii) heating the briquet composed of the dispersion-hardening alloy and extruding the briquet to form an electrode material composed of the dispersion-hardening alloy; and ix) annealing the electrode material composed of the dispersion-hardening alloy.

Preferably, the step vi) is performed at room temperature and under a pressure of between about 400 MPa and about 600 MPa, he step vii) is performed in an electrovacuum furnace at a temperature of between about 900° C. and about 1000° C. and under a pressure of between about 1400 MPa and about 1600 MPa, and the step ix) is performed at a temperature of between about 200° C. and about 1000° C. during 1 to 3 hours.

Therefore, the electrode made of the dispersion-hardening alloy comprising Cu—0.2% Be has some advantageous characteristics such as high heat resistance, high electrical conductivity, high heat conductivity, good consume resistance, good workability and so on because the beryllium oxide is homogeneously dispersed in the alloy.

BRIEF DESCRIPTION OF THE DRAWINGS

The above objects and advantages of the present invention will become more apparent by describing in detail the preferred embodiment thereof with reference to the attached drawings, in which:

FIGS. 3A to 3D illustrate manufacturing steps of an explosion compression method according to the present invention.

DETAILED DESCRIPTION OF THE INVENTION

Hereinafter, the preferred embodiment of the present invention will be explained in more detail with reference to the accompanying drawings.

Example

At first, a mixed alloy powder composed of copper (Cu) as a base metal and between about 0.1% and about 0.3%, preferably about 0.2% by weight of beryllium (Be) around the copper, was melted in an electrovacuum furnace. In this case, the alloy powder was melted by induction heating method under vacuum and the beryllium having a purity of 99.95% was used. Then, the melted alloy was changed into an alloy powder by an Atomization method.

It is required to remove an oxide generated during the above manufacturing steps so as to form a pure alloy powder when the oxide exists on the surface of the alloy powder. If an alloy powder having an oxide thereon is used, some problems may occur during the internal oxidation of the alloy powder in order to form a dispersion-hardening alloy composed of a copper-beryllium oxide. That is, the desired content of the beryllium oxide (BeO) in the dispersion-hardening alloy cannot be controlled as well as an undesirable copper oxide such as CuO and $Cu_2O$ may be formed in the dispersion-hardening alloy. The electrical conductivity of a resistance welding electrode is greatly lowered when the electrode is manufactured by using the impure dispersion-hardening alloy powder. Therefore, it is demanded to form the pure alloy powder which does not have the oxide on its surface when the alloy powder is produced by the above manufacturing steps. When the oxide is generated on the surface of the alloy powder, such oxide is removed.

The preferable method to remove oxide which exists on the surface of the alloy powder will be described. At first, the alloy powder having the oxide thereon was annealed at a temperature of between about 700° C. and 900° and under a vacuum, so the internal stress of the alloy powder was released and the grain of the alloy powder was fined. As a result, the density of an oxide film formed on the surface of the alloy powder was decreased and hydrogen could easily percolate into the oxide film during subsequent thermal reduction steps. Then, the alloy powder was reduced at a temperature of between about 400° C. and about 500° C. and under an atmosphere of hydrogen, thereby obtaining the pure alloy powder which had none of the oxide thereon.

In the meantime, the pure alloy powder could be obtained by the Atomization method without oxygen. In this case, the alloy powder was annealed under a vacuum after the melted alloy was changed into the alloy powder without oxygen, so the pure alloy powder could be obtained.

After the pure alloy powder was obtained, a thick plate having a thickness of about 1 mm was made of the pure alloy powder by using an ingot and a thick flake having a thickness of about 200 µm was also made of the pure alloy powder by using the ingot. Then, the thick plate and the thick flake were primary heated at a temperature of between about 400° C. and about 500° C. in air or under an atmosphere of oxygen, so oxide films were respectively formed on the thick plate and on the thick flake. Preferably, the plate and the flake were primary oxidized at a temperature of 450° C.

The primary oxidation of the thick plate and the thick flake was performed as follows.

About 100 g each of the thick plate and the thick flake were heated at the temperature of 450° C. in air or under the atmosphere of oxygen so as to respectively form oxide films on the plate and on the flake after the plate and the flake were inserted into a constant-temperature oven. In this case, the primary oxidation of the plate and the flake were occurred according to the following reaction formula (1);

$$2Cu + \tfrac{1}{2}O_2 \rightarrow Cu_2O \qquad \text{reaction formula (1)}$$

The oxidation time for forming the oxide film with a necessary thickness was regulated by increasing a fraction weight ($W_f$) determined by oxygen retained in the oxide film. The fraction weight was calculated when transformed oxide-forming alloying elements changed into oxides according to the following equation (1);

$$W_f = a \times b \times W_{Cu} \times A_O \times A_{re} \qquad \text{equation (1).}$$

In the above equation (1), a stands for the stoichiometric ratio (for example, BeO=1 and $Al_2O_3=\tfrac{2}{3}$), b stands for the weight part of alloying element in the alloy powder, $W_{Cu}$ is the weight of the copper, and $A_O$ and $A_{re}$ are the atomic weights of the oxygen and the oxide-forming element respectively.

Subsequently, the thick plate was internally oxidized at a temperature of between about 900° C. and about 1000° C. in a container filled with powders of Cu, $Cu_2O$ and BeO. Preferably, the internal oxidation of the thick plate was performed at a temperature of about 950° C. for an hour. However, the thick flake was internally oxidized at a temperature of between about 900° C. and about 1000° C., preferably about 950° C., for half an hour under an atmosphere of inert gas such as argon (Ar) or Helium (He). The internal oxidations of the plate and the flake were performed according to the following reaction formulae (2) and (3);

$$Cu_2O \rightarrow 2Cu + \tfrac{1}{2}O_2 \qquad \text{reaction formula (2),}$$

$$Be + \tfrac{1}{2}O_2 \rightarrow BeO \qquad \text{reaction formula (3).}$$

All the cases of the internal oxidation temperature were chosen by decreasing the grain boundary influence on the line form of the internal oxidation front and by conserving a small size of particles of a strengthen phase. The temperature 950° C. was found to be optimal according to the present invention.

In general, the internal oxidation is a kind of a precipitated hardening by which a binary system is formed by the precipitated hardening of a secondary phase (oxide particle). At that time, the stability of the material having the precipitated hardening secondary phase is determined by the magnitude of the diffusion of the oxide particle. That is, the stability is determined by the atomic exchange of the oxide particle and the material. When the second phase is a compound having a high melting point and does not have the atom of the base material, the stability of the material can be obtained. Also, when the oxide particle is favorably dispersed, the material has high strength by adding a small quantity of oxide particles such as beryllium oxide, so the material has similar characteristics of high electrical conductivity and high heat conductivity like the pure copper.

Alloys obtained by the internal oxidation method are metal matrices with oxide particles distributed therein. It is possible to realize the internal oxidation alloys under the following conditions.

The base alloying metal should have a considerable oxygen solubility, the absolute free energy number of the alloying element should far exceed that of the base metal of the alloy, and the oxygen diffusion velocity should be far in excess of the oxygen diffusion velocity.

In the present embodiment, aluminum (Al), beryllium, silicon (Si), titanium (Ti) or zirconium (Zr) could be used as the oxide-forming elements when the copper was the base metal. Both binary and triple alloys were also considerable. In this case, the internal oxidation was performed by means of maintaining the absolute value of the free energy required for forming the oxide particle. Heat loss was generally accompanied by the internal oxidation reaction. The oxygen was rapidly diffused into a base alloying metal when the pressure of the oxygen gas at the surface of the base alloying metal was equal to the dissociation pressure of the oxide particle of the base alloying metal.

In the above-described internal oxidation reaction, the partial pressure of oxygen gas at the surface of the base alloying metal was determined by the following reaction formula (4);

$$Cu_2O \rightarrow 2Cu + \tfrac{1}{2}O_2 \qquad \text{reaction formula (4).}$$

In this case, the equilibrium constant, $K_p$, was obtained by the following equation (2);

$$\log K_p = -\Delta F_T / 2.303 RT \qquad \text{equation (2)}$$

wherein the $\Delta F_T$ means the variation of the free energy (F) at the temperature of T, T is the absolute temperature and R is the gas constant.

In the above reaction formula (4), since the $Cu_2O$ and the Cu existed in the condensed state, the equilibrium constant ($K_p$) was determined by the partial pressure of the oxygen gas ($Po_2$) according to the following equation (3);

$$K_p = |Po_2|^{1/2} \qquad \text{equation (3).}$$

That is, $(P_{Cu})^2$ and $PCu_2O$ were neglected from the equation that $K_p = \{(P_{Cu})^2 \cdot Po_2^{1/2}\}/PCu_2O$.

At that time, the pressure of the oxygen was constant and the solubility of the oxygen was proportional to $\sqrt{(Po_2)}$ according to Henry's Law. However, the oxide film could not be formed on the surface of the base alloying metal when the partial pressure of the oxide such as beryllium oxide or aluminum oxide contained in the base alloying metal was lower than the pressure of the oxygen. Also, if the pressure of oxygen was kept constant in the internal oxidation, the internal oxidation reaction occurred at the temperature that the solubility of the oxygen in the base alloying metal was neglected because the solubility of the oxygen was determined by Henry's Law.

When the temperature of the base alloying metal was raised after the oxide film was formed on the surface of the base alloying metal, the oxygen on the surface was diffused into the base alloying metal to react with the beryllium in the base alloying metal, so the internal oxidation reaction was performed according as the beryllium oxide was formed in the base alloying metal. The size of the oxide in the base alloying metal was determined by the temperature of the internal oxidation reaction and the concentration of the oxide (the oxide formed on the surface of the base alloying metal).

Some mechanical properties of alloying metals are shown in table 1 according to the embodiment and comparative examples according to the present invention. In table 1, the alloying metals were obtained by using the copper as the base metal and some kinds of additives such as beryllium, aluminum, titanium, zirconium, silicon, etc.

In table 1, d is the mean size of alloy particles in the thick plate or the thick flake for a distance of between 0.4 mm and 0.5 mm from the surfaces of the thick plate or the thick flake, $\Delta F$ means the negative value of the free energy for the oxide formation, the type of the particles is determined by diffraction, $\sigma$ stands for the rupture strength at the temperature of about 20° C. and $\delta$ stands for the relative elongation.

TABLE 1

| | Alloying metals | d (nm) | $\Delta F$ (cal/g · atom) | Type of oxide particle | $\sigma$ (MPa) | $\delta$ (%) |
|---|---|---|---|---|---|---|
| Example | Cu-0.2%Be | 13 | 115,250 | BeO | 400 | 4 |
| Comparative Example | Cu-0.2%Al | 25 | 103,133 | $Al_2O_3$ | 300 | 20 |
| Comparative Example | Cu-0.4%Al | 30 | 103,133 | $Al_2O_3$ | 360 | 13 |
| | Cu-0.2%Ti | 20 | 86,945 | $TiO_2$ | 230 | 16 |
| | Cu-0.4%Zr | 21 | 103,700 | $ZrO_2$ | 290 | 18 |
| | Cu-0.2%Si | 70 | 76,100 | $SiO_2$ | 180 | 17 |
| | Cu-0.2%Al-0.05%Ti | 20 | • | $Al_2O_3$, $TiO_2$ | 320 | 9 |
| | Cu-0.4%Al-0.05%Be | 20 | • | $Al_2O_3$, BeO | • | • |
| | Cu-0.2%Al-0.05%Si | 20 | • | $Al_2O_3$ | 340 | 10 |
| | Cu-0.2%Si-0.05%Be | 30 | • | BeO | 270 | 6 |
| | Cu-0.2%Si-0.05%Ti | 56 | • | $TiO_2$ | 290 | 7 |

In the present invention, the average size of the beryllium oxide particles and the aluminum oxide particles precipitated during the internal oxidation of the copper alloys was abruptly changed for the first hour of the internal oxidation process, however, the average size of the oxide particles was weakly changed or not at all during the following exposures for about 300 hours.

It was obvious that the main factor determining the size of the oxide particles during the internal oxidation process was the critical nucleus size. The critical nucleus size, $\upsilon$, was determined by the following equation (4);

$$\upsilon = 2\alpha/\Delta F \qquad \text{equation (4).}$$

In the above equation (4), $\alpha$ is the specific surface energy caused by the volume changes of the precipitated particles. Also, $\Delta F$, the oxide formation heat, is determined by using the following equation (5) for a free energy change in the precipitation of a new phase;

$$\Delta F = V \times \Delta F_v + \alpha S + \Delta F_z \qquad \text{equation (5)}$$

where $\Delta F_v$ is the free energy change per unit volume, V is the nucleus volume, S is the specific surface area of the nucleus, and $\Delta F_z$ is the free energy change caused by the precipitated particle.

The internal oxidation process permitted obtaining fine-dispersed precipitations by virtue of the high value of the oxide formation heat ($\Delta F$). However, the high value of the specific surface energy ($\alpha$) determined by the low interaction between metal atoms and the oxides decreased the strengthening effect. Therefore, the specific surface energy decrease at the precipitation-matrix interface was one way of increasing the strength of alloys involving oxide particles.

The previous investigation performed by modifying the structure and changing mechanical characteristics of the internally oxidized alloys through additional alloying, on insertion of the second oxide-forming element, showed that this internal oxidation process caused the increase of particle dispersion or the change of oxide particle forms of the hardening phase determining the increase of alloy strength properties.

When the oxide films existed on the surface of the thick plate and the thick flake each of dispersion-hardening alloy composed of the copper-beryllium oxide after the internal oxidation process, the dispersion-hardening alloy did not bond to an electrode base metal during the formation of an electrode. Thus, after the plate and the flake were reduced by heating for half an hour at a temperature of between about 400° C. and about 500° C. under an atmosphere of hydrogen, the plate and the flake were cooled under the atmosphere of hydrogen so that the oxide films formed on the surface of the base alloying metal were removed.

When the electrode material was made of the dispersion-hardening alloy composed of the copper-beryllium oxide after the oxide film on the surface of the dispersion-hardening alloy was removed, the electrode having dense tissue could be obtained by using the electrode material because the electrode material had excellent workability.

Comparative Example

According to the above-described manufacturing method of the embodiment, a first dispersion-hardening alloy composed of copper as a base metal and about 0.4% by weight of aluminum around the copper was manufactured and a second dispersion-hardening alloy composed of copper and about 0.2% by weight of aluminum around the copper was manufactured. The properties of the dispersion-hardening alloys according to the comparative example were shown in table 1.

It will be described that the steps for manufacturing electrode by using the dispersion-hardening alloy which were internally oxidized and composed of Cu-0.2% beryllium, by using the first dispersion-hardening alloy composed of Cu-0.4% aluminum, and by the second dispersion-hardening alloy using Cu-0.2% aluminum.

Electrode materials composed of the dispersion-hardening alloys were respectively manufactured by an explosive welding method, an explosion compression (dynamic) method and a quasi dynamic (extrusion) method after thick plates having thicknesses of about 1 mm, thick flakes having thicknesses of about 200 μm, and powders having particle sizes of about 100 μm are respectively made of the dispersion-hardening alloys according to the embodiment and the comparative example.

At first, the explosive welding method will be described.

Figure 1:
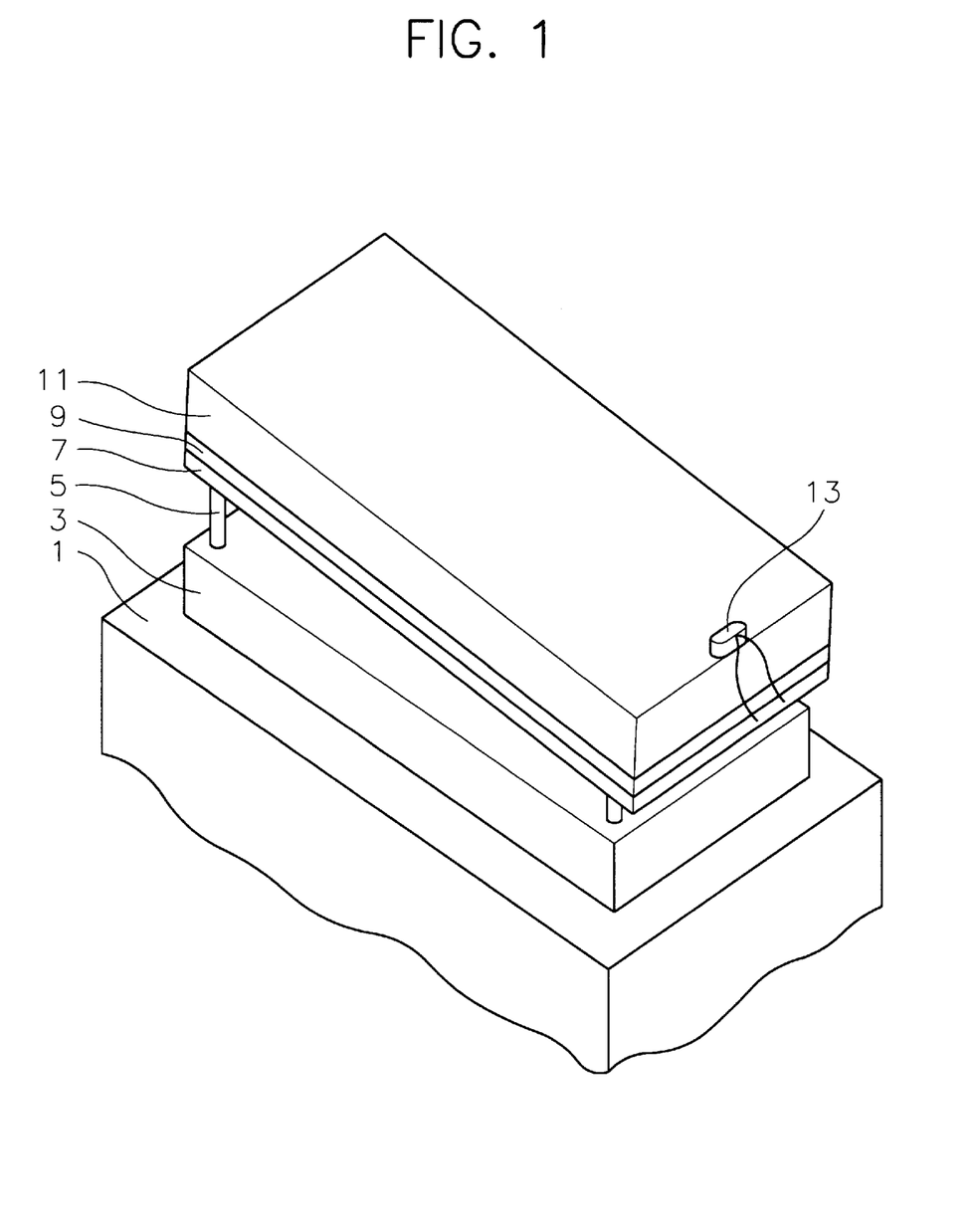
FIG. 1 is a prospective view for illustrating an explosive welding method according to the present invention.

In the explosive welding method, after a shock wave was generated by the explosion of an explosive with an asymmetric scheme as shown in FIG. 1, the conjugating energy according to the shock wave was applied to the plates to weld the dispersion-hardening alloys onto an electrode base composed of copper.

Figure 2A:
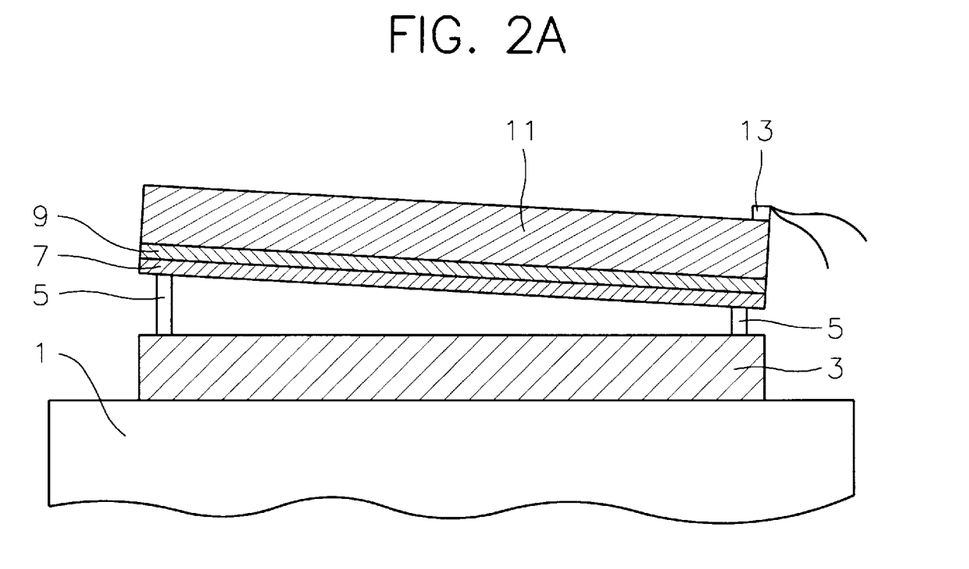
FIGS. 2A to 2C illustrate the manufacturing steps of the explosive welding method according to the present invention.
Figure 2B:
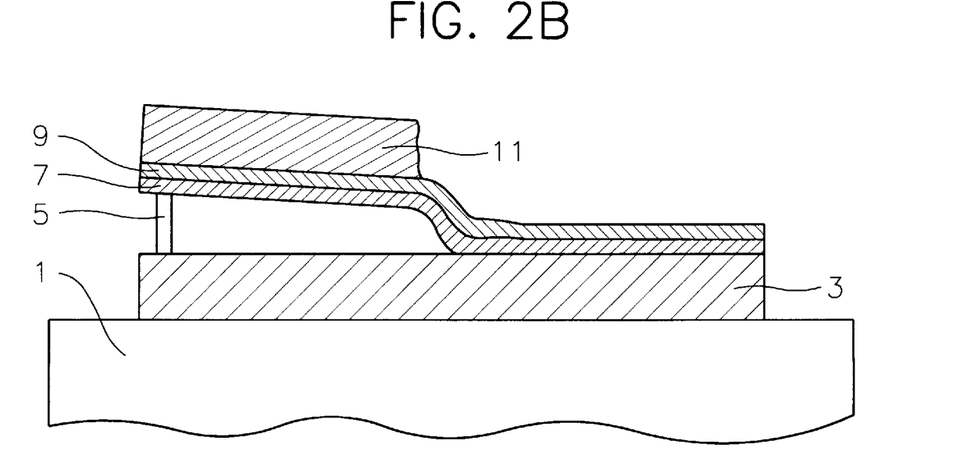
Figure 2C:
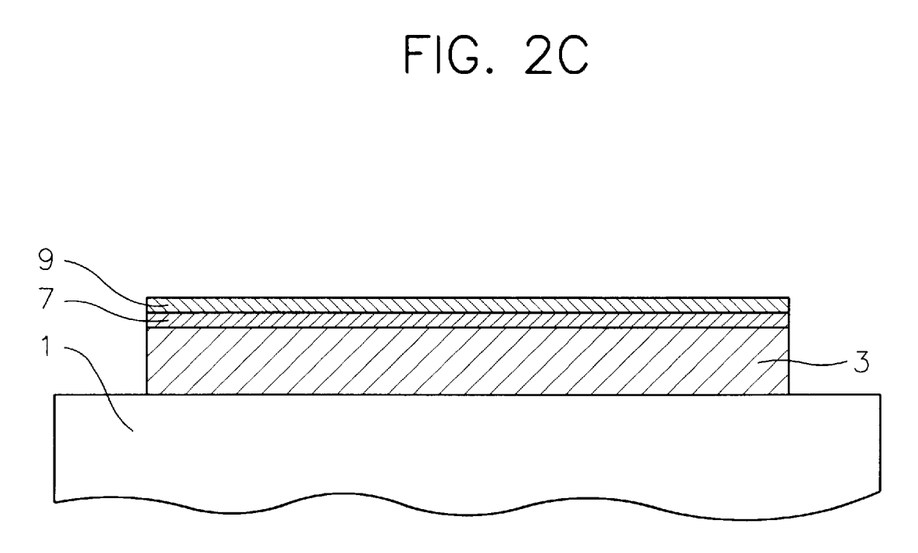

FIG. 1 is a prospective view for illustrating the explosive welding method according to the present invention and FIGS. 2A to 2C illustrate the manufacturing steps of the explosive welding method.

Referring to FIG. 1, the plate 7 was correspondably installed above an electrode base 3 after the electrode base 3 composed of copper was mounted on a supporting member 1. The plate 7 had the thickness of about 1 mm and an area of about 200×60 $mm^2$. Four spacers 5 were interposed between the electrode base 3 and the plate 7 for the asymmetric scheme. That is, two spacers 5 of one side were higher than other spacers 5 of the other side. An asymmetric gap was generated between the electrode base 3 and the plate 7 by the spacers 5.

An internal pad 9 was attached on the plate 7 and an explosive 11 having a sheet shape was charged on the internal pad 9, so the preparation of the explosion was complete after a percussion cap 13 was connected to the explosive 11.

Subsequently, the percussion cap 13 was ignited in order to detonate the explosive 11, so the shock wave was generated by the detonation of the explosive 11.

Referring to FIGS. 2A to 2C, the internal pad 9 and the plate 7 were collided with the electrode base 3 composed of copper by a predetermined angle. Then, the plate 7 was percussively welded to the electrode base 3 by means of the conjugating energy caused by the shock wave. Therefore, a plate-shaped composite electrode material composed of the copper and the dispersion-hardening alloy was produced.

As the explosive welding process was very rapidly performed, the metal around the conjugating surfaces between the electrode base 3 and the plate 7 were melted and a metal jet stream was generated in front of the conjugating surfaces. The metal jet stream removed the impurities on the surface of the plate 7 composed of the dispersion-hardening alloy, so the surface of the plate 7 became pure and the portion about the conjugating surface of the plate 7 was plastically deformed to conjugate the electrode base 3. The structures of conjugating surfaces between the electrode base 3 and the plate 7 had unique shapes.

In the explosive welding method, the choice of the explosive welding parameters were chosen for a maximum strength of the welded plate 7, which should be equal to or more than a pressure of between about 340 MPa and about 360 MPa. From reasoning that were the optimal parameter values which were found such as the colliding velocity of the plate was between about 450 m/s and about 500 m/s, the conjugation velocity was between about 1700 m/s and about 2000 m/s, and the colliding angle was between about 12° and about 14°. In this case, the composite electrode material came to be monolithic because the plate 7 percussively welded to the electrode base 3 by means of the intensive percussive wave.

Next, the explosion compression (dynamic) method will be described.

Figure 3A:
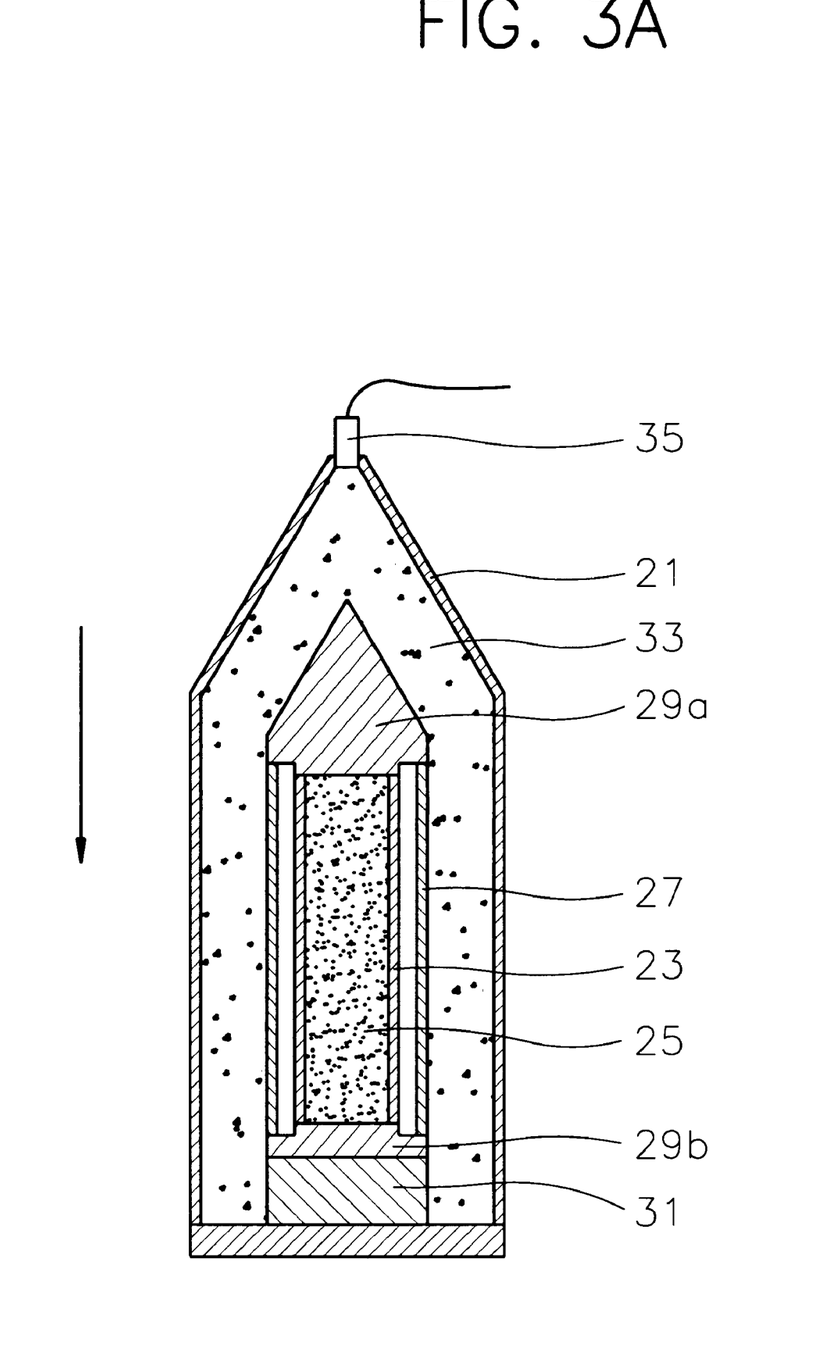
Figure 3B:
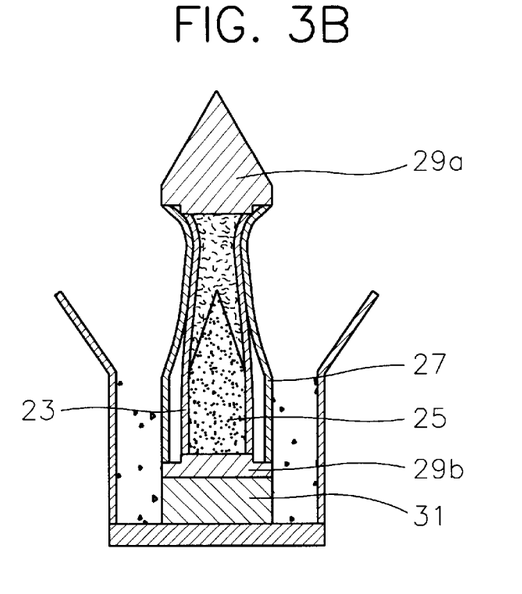
Figure 3C:
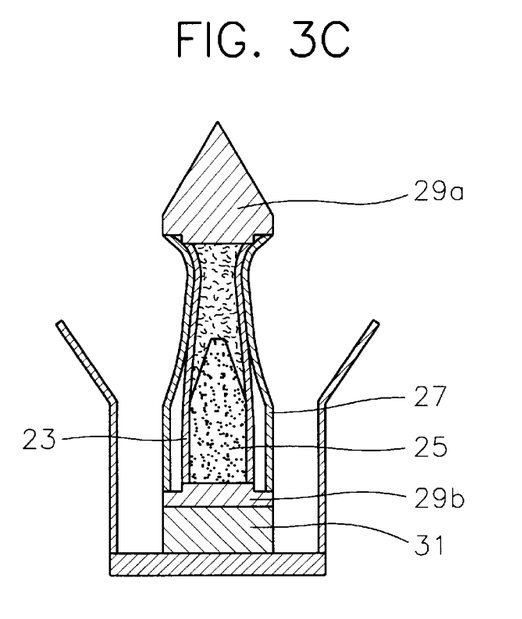

In the explosion compression method, after a shock wave was generated by the detonation of an explosive with a symmetric scheme as shown in FIGS. 3A to 3C, and then the conjugating energy caused by the shock wave was applied to the powder 25 in a powder container 23 to form an electrode material having a rod shape.

FIGS. 3A to 3D illustrate manufacturing steps of the explosion compression method.

Referring to FIGS. 3A to 3C, an inner tube 27 was installed in an explosive container 21 having a double structure and the powder 25 of the dispersion-hardening alloy was charged in the powder container 23. Subsequently, the powder container 23 was inserted in the inner tube 27 at a predetermined interval and was mounted on a stage 31 in the explosive container 21 after both ends of the powder container 23 were sealed by using plugs 29a, 29b. A percussion cap 35 was connected to an explosive 33 after the explosive 33 was charged between the inner tube 27 and an inner wall of the explosive container 21.

When the explosive 33 was completed charged, the percussion cap 35 was ignited in order to detonate the explosive 33, so a shock wave was generated by the detonation of the explosive 33 and was rapidly applied to the powder 25 in the vertical direction (see an arrow in FIG. 3A). Thus, the powder 25 was percussively compressed by the detonation.

That is, when the inner tube 27 and the powder 25 are coaxially compressed by the shock wave, the percussion energy caused by the shock wave was applied to the surfaces of the particles of the powder 27 and the distance of the particles of the powder 27 were rapidly reduced. The explosion compression was similar to an adiabatic compression. If the generation of the percussion energy and the application of the percussion energy were gently performed, heat caused by the percussion energy was transmitted to the powder 25 so that the powder 25 was melted to form a rod shape.

In the explosion compression method, the velocity of the shock wave was converged between about 1600 m/sec and about 8400, preferably between 2000 m/sec and 3000 m/sec and the explosion pressure was converged between about 5 kbar and about 500 kbar, preferably 300 kbar.

However, the electrode material made of the dispersion-hardening alloy did not have good strength according to the explosion compression method. The average hardness of the electrode material by the explosion compression method was about 130 to 150 MPa and the strength was about 30 MPa. When the electrode material was compressed to form a briquet at a temperature of about 800° C., the density of the briquet was about 99.95% of a theoretical value. Hence, according to the explosion compression method, the electrode material was not suitable for the high strength electrode material but it was proper for a dense briquet.

Finally, the quasi-dynamic (extrusion) method will be described.

In the quasi-dynamic method, a briquet having a mass of about 500 g was formed by pressing the flake composed of the dispersion-hardening alloy. At that time, the pressing was performed at room temperature and under a pressure of between about 400 MPa and about 600 MPa, preferably 500 MPa so that the residual porosity of the briquet was from 1 to 15%.

Subsequently, the briquet was compressed under a pressure of about 1500 MPa to obtain a dense briquet having a residual porosity of about 1% after the briquet was heated at a temperature of between about 900° C. and about 1000° C., preferably 950° C., in an electrovacuum furnace and the briquet was held for about 1 hour.

The dense briquet was heated at a temperature of between about 900° C. and about 1100° C., preferably 1000° C., in the electrovacuum furnace under an atmosphere of oxygen, so a heated briquet was obtained. Then, an electrode material having a rod shape was produced by extruding the heated briquet.

Subsequently, the rod-shaped electrode material was annealed at a temperature of between about 200° C. and about 1000° C. for 1 to 3 hours, preferably 2 hours. The fibrous nature of the strength of the electrode material was determined by the extrusion process. The mechanical properties of the rod-shaped electrode material are shown in the following table 2.

TABLE 2

| Alloy | T = 20° C. | | | T = 450° C. | T = 800° C. |
|---|---|---|---|---|---|
| metal | σ1(MPa) | Hv(50Pa) | H$_R$B | σ1(MPa) | H$_R$B |
| Cu-0.2% Al | 310 | 110 | • | 185 | • |
| Cu-0.4% Al | 340 | 130 | 70 | 180 | 70 |
| Cu-0.2% Be | 400 | 155 | 75 | 190 | 70 |

In table 2, $\sigma_1$ stands for strength, Hv is the Vickers hardness, and H$_R$B is the Rockwell hardness B-scale. The microhardness values of the rod-shaped electrode material was depended on the annealing time. The given results revealed the structural stability of internally oxidized alloys at the working temperature of electrodes and the prospects for use of the electrodes.

Electrodes were made of the internally oxidized Cu—0.2%Be, Cu—0.2%Al and Cu—0.4%Al alloys by the explosive welding method and the quasi-dynamic method according to the present invention.

For the testing of the electrodes respectively composed of Cu—0.2%Be, Cu—0.2%Al and Cu—0.4%Al, an aluminum alloy plate having a thickness of about 1.2 mm was used. As the result of the testing, the electrode composed of Cu—0.2%Be had excellent abrasion resistance of about seventy times longer than that of the conventional copper electrode though the electrodes composed of Cu—0.2%Al and Cu—0.4%Al had good consume resistance which was ten times longer than the conventional electrode.

As the analysis results of the structure and physicomechanical properties had shown, the advantages of the internally oxidized alloy were determined by the high dispersity grade of the strengthening phase particles providing its high strength properties as compared with other alloys for an equivalent volummetric content of the oxide phase. The dispersion-hardening alloy composed of copper-beryllium oxide had high values of the heat conductivity and the electrical conductivity as compared to other oxides. The heat conductivity and the electrical conductivity each of the dispersion-hardening alloy composed of copper-beryllium oxide were respectively at least one order larger than those of the dispersion-hardening alloy composed of copper-aluminum oxide. This provided the resistance decrease at the electrode-welded metal boundary. Also, the carrying away of a welded material to the electrode made of the dispersion-hardening alloy composed of copper-beryllium oxide decreased as compared to the dispersion-hardening alloy composed of copper-aluminum oxide.

As it is described above, the internally oxidized alloy containing Cu—0.2%Be according to the present invention is excellently suitable for the electrode material. Therefore, since the beryllium oxide is homogeneously dispersed in the alloy containing Cu—0.2%Be, the electrode made of the alloy containing Cu—0.2%Be can have some advantageous characteristics such as high heat resistance, high electrical conductivity, high heat conductivity, good abrasion resistance, good workability and so on.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A method for manufacturing an electrode material comprising the steps of:

i) annealing an alloy powder comprising copper and between about 0.1% and about 0.3% by weight of beryllium around the copper under a vacuum;

ii) reducing said alloy powder by removing an oxide in said alloy powder to form a pure alloy powder;

iii) oxidizing a surface of said pure alloy powder by heating said pure alloy powder;

iv) oxidizing the beryllium contained in said pure alloy powder to form beryllium oxide in said pure alloy powder; and v) reducing said pure alloy powder under an atmosphere of hydrogen to form a powder of a dispersion-hardening alloy comprising copper-beryllium oxide.

2. The method for manufacturing an electrode material as claimed in claim 1, wherein said step ii) is performed at a temperature of between about 400° C. and about 500° C. and under an atmosphere of hydrogen.

3. The method for manufacturing an electrode material as claimed in claim 1, wherein said step iii) is performed at a temperature of between about 400° C. and about 500° C. and under an atmosphere of oxygen.

4. The method for manufacturing an electrode material as claimed in claim 1, wherein said step iv) is performed at a temperature of between about 900° C. and about 1000° C. and under an atmosphere of inert gas.

5. An electrode material comprising a dispersion hardening alloy according to the method as claimed in claim 1.

* * * * *